United States Patent

[11] 3,600,942

| | | |
|---|---|---|
| [72] | Inventor | Albert E. Brendel<br>Lake Orion, Mich. |
| [21] | Appl. No. | 8,668 |
| [22] | Filed | Feb. 4, 1970 |
| [45] | Patented | Aug. 24, 1971 |
| [73] | Assignee | Lebow Associates, Inc.<br>Troy, Mich. |

[54] LOAD CELL
9 Claims, 7 Drawing Figs.

[52] U.S. Cl. .................................................. 73/141,
338/5
[51] Int. Cl. ................................................. G01l 5/12
[50] Field of Search .................................. 73/141, 141
A, 133, 88.5; 338/2–5

[56] References Cited
UNITED STATES PATENTS

| 2,741,120 | 4/1956 | Ormsby | 73/141 |
| 3,216,245 | 11/1965 | Seed | 73/141 |
| 3,309,922 | 3/1967 | Green | 73/141 |
| 3,439,761 | 4/1969 | Laimins | 177/211 |
| 3,464,259 | 9/1969 | Farr | 73/88.5 |

FOREIGN PATENTS

| 957,980 | 2/1957 | Germany |
| 162,345 | 9/1964 | U.S.S.R. |

Primary Examiner—Richard C. Queisser
Assistant Examiner—John Whalen
Attorney—Cullen, Settle, Sloman & Cantor ABSTRACT: A load cell for isolating and measuring forces along a single preselected axis comprises a pair of identical beam systems, each beam system consisting of four coplanar beams arranged as the sides of a square, and the plane of each system being oriented perpendicularly to the preselected axis. The two beam systems are spaced from each other along the preselected axis and oriented so that the beams of one system are aligned with respective beams of the other system. The only interconnection between the two beam systems consists of two unconnected substantially rigid auxiliary structures, one of which interconnects the diagonally opposite vertices of one beam system with each other and with the corresponding vertices of the other beam system, while the second auxiliary structure interconnects the remaining diagonally opposite vertices of both beam systems. The beams are dimensioned to be resiliently yieldable within the range of forces to be measured. Only forces applied to the auxiliary structures along the preselected axis will produce bending strains in the beams, while all extraneous external moments and forces will induce compressive or tensile strains in the beams rather than bending forces. Strain gages on the beams can then be calibrated to measure the unknown force along the preselected axis in terms of such bending strains.

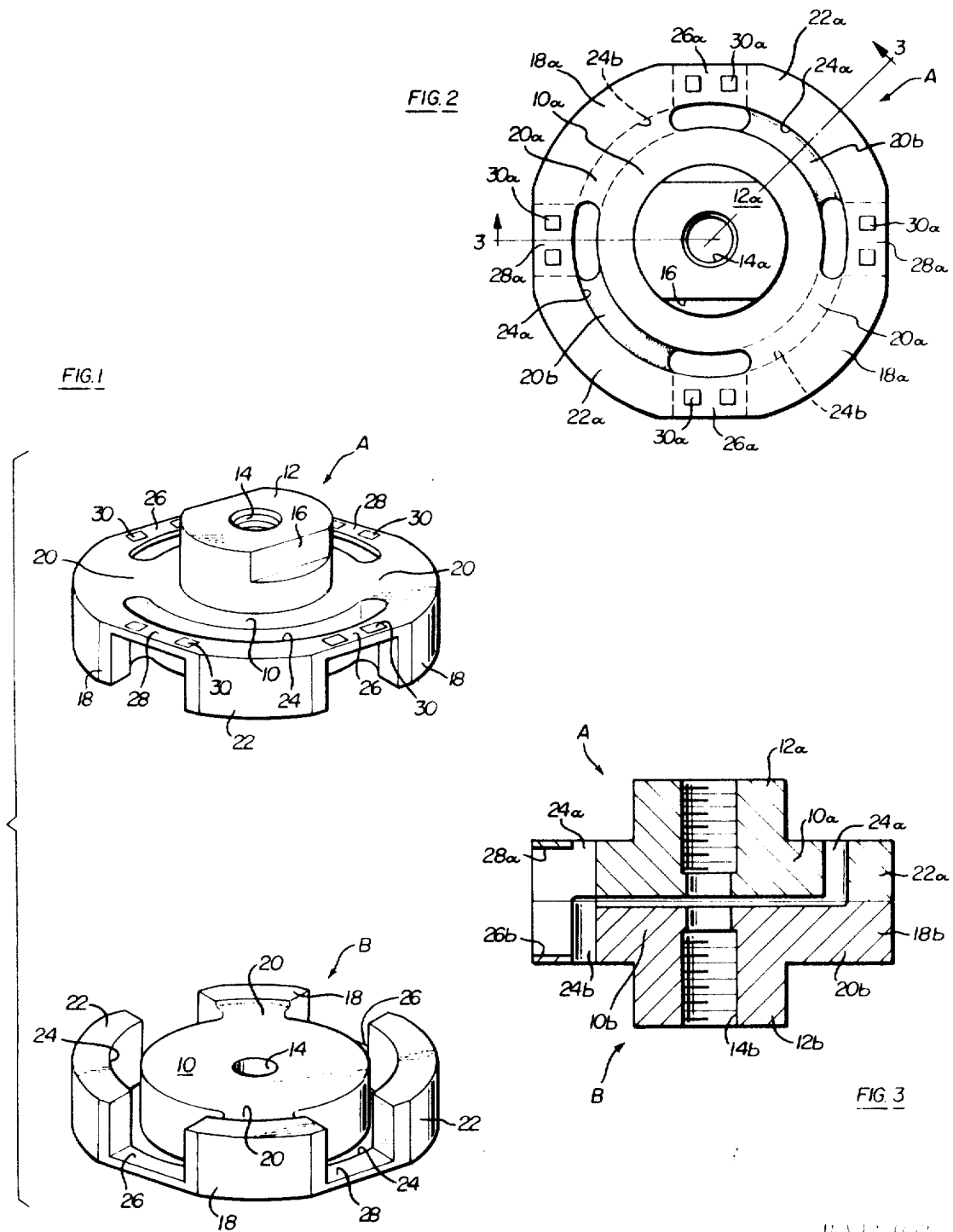

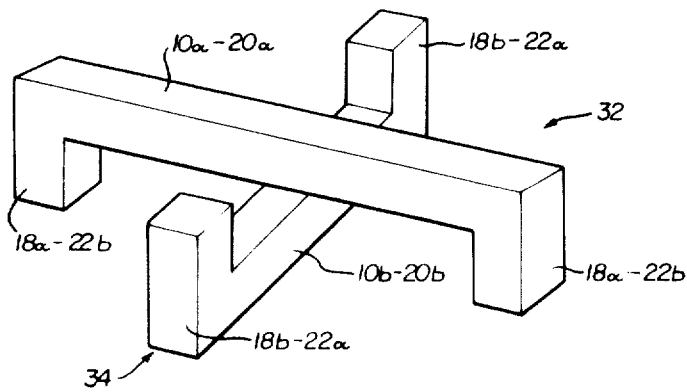
FIG. 4
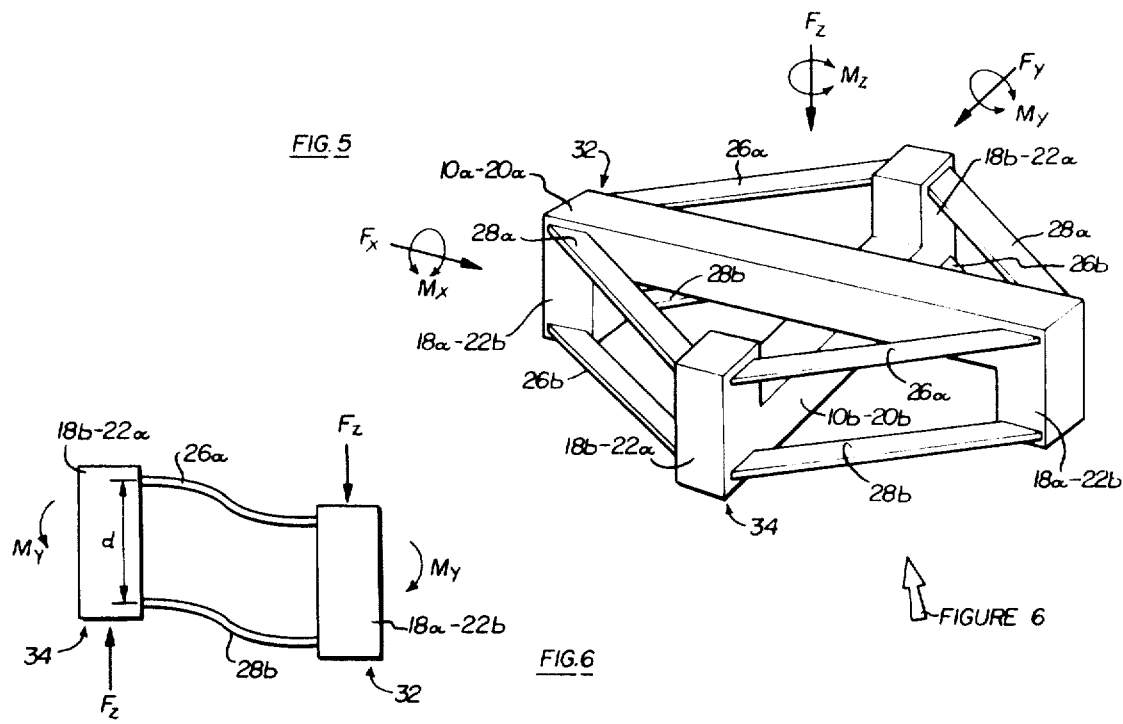
FIG. 5
FIG. 6
FIGURE 6
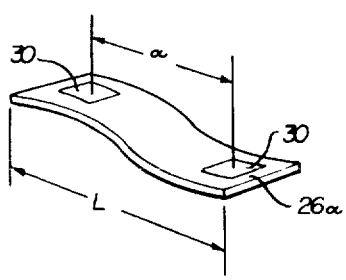
FIG. 7
INVENTOR.
ALBERT E. BRENDEL
BY
CULLEN, SETTLE, SLOMAN & CANTOR.
ATT'YS.

3,600,942

LOAD CELL

BACKGROUND OF THE INVENTION

This invention is concerned with improvements in beam-type load cells. The purpose of such cells is to isolate and measure the magnitude of forces acting along a single preselected axis, while remaining insensitive to all extraneous forces and moments. This is generally accomplished by providing some type of auxiliary structure, which is assumed to be perfectly rigid, for transmitting the externally applied forces to a system of beams to which are applied a series of strain gages. The arrangement of the beams and the auxiliary structure is intended to cause all extraneous forces and moments to load the beams in compression or tension, while permitting only the force to be measured along the preselected axis to subject the beams to bending stresses. The strain gages then measure the strain induced in the beams from such bending stresses, and in this way measure the unknown force.

Heretofore, however, beam-type load cells have only approximated these theoretical results. They tend to be unstable when subjected to torques or moments about the preselected axis. Their size and design has generally been rather awkward and unwieldy, so that much of the overall dimension is consumed by the auxiliary structures. This inefficient use of available space lowers the capacity of the load cell, since it prevents maximum spread or moment arm between reactive couple elements in the beam pairs, which in turn increases the magnitude of the forces carried by the beams.

Another disadvantage with prior art beam systems is that they are frequently sensitive to the point of application of the force to be measured, so that slight misalignments of the applied force and the load cell distort the data.

Hence, the purpose of this invention is to provide an improved beam type of load cell, which is linear throughout a greater range of applied forces, and which has an increased degree of insensitivity to all extraneous forces and moments as well as improved rejection of undesired structural deformations.

It is a further object of this invention to provide an improved beam-type load cell which provides maximum spacing of the beams for a given external dimension.

It is another object of this invention to provide an improved beam-type load cell wherein the beams are exposed for greater convenience of mounting and electrically connecting the strain gages.

Other objects and advantages will become apparent from the following specification.

BRIEF DESCRIPTION OF THE DRAWINGS

FIG. 1 is an exploded perspective view of the load cell of this invention, showing the upper and lower halves separated along the sensitive axis.

FIG. 2 is a plan view of the load cell of FIG. 1.

FIG. 3 is a cross-sectional elevation viewed in the direction of arrows 3—3 of FIG. 2.

FIG. 4 is a perspective view of an analogous model of the auxiliary structure of the load cell, oriented in the same direction as is FIG. 1.

FIG. 5 is a view similar to FIG. 4, but additionally showing the strain gage-bearing beams which interconnect the auxiliary structures.

FIG. 6 is a force diagram showing the forces acting on a portion of the load cell model of FIG. 5, viewed in the direction of Arrow 6.

FIG. 7 is a perspective view of a typical beam, showing the manner in which it deflects when subjected to bending forces, and further showing the location of the strain gages.

DETAILED DESCRIPTION OF THE INVENTION

Referring to FIG. 1 of the drawings, it will be seen that improved load cell of this invention generally comprises identical upper and lower half portions A and B, respectively. For assembly, one section is merely inverted and then rotated 90° about its vertical axis and then the two sections are abutted together and brazed or otherwise joined.

Each of sections A and B comprises a central hub 10 from which projects mounting boss 12 provided with a central threaded hole 14 and wrench flats 16. This is the structure which provides the external connection to the force applying members.

Sections A and B are each provided with a pair of diametrically opposite columns 18 which are joined with central hub 10 by a bridge portion 20. At the outer ends of a diameter which is perpendicular to and coplanar with the above-described diameter interconnecting columns 18, there is provided a pair of column extensions 22, which are spaced from central hub 10 by arcuate slots 24. The only connections between column extensions 22 and the main structure of each half of the load cell is provided by two pairs of diametrically opposite beam pairs 26 and 28. These are the beams to which are applied strain gages 30, as will be described in further detail below.

A comparison of the inverted portions A and B of the load cell as shown in FIG. 1 will make the relationship of columns 18, bridges 20 and column extensions 22 more apparent, remembering that lower portion B is indexed 90° and inverted with respect to upper portion A.

As will be most apparent from the lower portion of FIG. 1 showing load cell lower half B, the upper ends of columns 18 and columns extensions 22 lie in a common plane, so that when the upper and lower halves A and B are joined together, the ends of columns 18 of upper half A abut in face to face relationship the ends of column extensions 22 of lower half B, while the ends of column extensions 22 of upper half A similarly abut the ends of columns 18 of lower half B.

It will also be apparent from lower half B illustrated in FIG. 1 that the plane of the upper surface of central hub 10 is below the plane of the upper ends of columns 18 and column extensions 22. Thus, when upper and lower halves A and B are brought together, the only points of contact are where the columns and column extensions abut, there being no contact between the slightly spaced apart and inwardly facing surfaces of central hub 10.

In FIGS. 2 and 3 of the drawings, the lower case suffixes "a" and "b" have been added after the reference numerals, to more clearly delineate the portions of the upper and lower halves of the assembled load cell. From FIG. 2 it will be apparent that the two halves are indexed 90° before assembly, since the lower hub-column bridge 20b can be seen through the upper arcuate slots 24. Similarly, the central portion of lower slots 24b is hidden behind the upper hub-column bridges 20a and is shown dotted.

From FIG. 3 it is again evident that the sole points of contact between upper and lower halves A and B exist where columns 18 and column extensions 22 abut, the particular contact shown in this view being between one of the upper column extensions 22a and one of the lower columns 18b.

The precise relationship of the components and manner in which the beams 26 and 28 are loaded may be more readily understood from FIGS. 4 and 5. These figures show an analogous and simplified model representing the essential relationships of the components.

Referring first to FIG. 4, there is illustrated two identical U-shaped structures 32 and 34, oriented perpendicularly to each other and inverted. Thus, they have the same relationship to each other as do upper and lower halves A and B of the actual load cell of FIGS. 1—3. The model of FIG. 4 is viewed from the same direction as is the load cell of FIG. 1, so that the relationship of the corresponding parts will be more evident.

It will first be observed from FIG. 4 that upper structure 32 comprises a horizontal central portion 10a—20a. The use of the combined and hyphenated reference numerals indicate that this horizontal structure corresponds with central hub 10 and hub-column bridges 20 of upper half A. From each end of structure 32 there descends a vertical portion 18a–22 b, indicating that each of such vertical portions corresponds to columns 18 of upper portion A and column extension 22 of lower portion B. Thus, upper structure 32 is actually a composite of contacting portions of upper and lower halves A and B of the actual load cell of FIG. 1.

Similarly, lower structure 34 comprises a horizontal portion 10a–20 corresponding to central hub 10 and hub-column bridges 20 of lower half B. A pair of upwardly extending legs 18b–22 corresponds with columns 18b of lower half B and column extensions 22a of upper portion A.

The beams 26 and 28 have been omitted from FIG. 4 for clarity, and therefore structures 32 and 34 simulate only the auxiliary portions of the actual load cell. It will be understood as explained above that there is no connection whatsoever between upper and lower structures 32 and 34 in the structure illustrated in FIG. 4.

Referring now to FIG. 5, the beams 26 and 28 which provide the sole connection between upper and lower structures 32 and 34 have been added to complete the schematic model of the load cell of FIG. 1. The upper series of four coplanar beams consists of two pairs of opposing beams 26a and 28a, while the lower series of four coplanar beams consists of two similar pairs 26b and 28b.

From FIGS. 1 and 5, it will be evident that the beams 26 and 28 have relatively shallow sections to facilitate bending in response to vertical loading, while the remaining auxiliary structure is relatively massive and can be assumed to be rigid within the range of forces to be measured. Furthermore, the shape of the beams makes them stiff or relatively unyielding to bending about the Z axis.

The strain gages 30 are secured to beams 26 and 28 with their active axis aligned with the longitudinal axis of the supporting beam, and located at the neutral axis of the face of the beam.

The three mutually perpendicular force-moment axis systems are also shown in FIG. 5. The vertical or Z axis is the axis along which the load cell is designed to measure force magnitudes. As will be explained below, forces applied to the upper and lower structures 32 and 34 (that is, applied to bosses 12 of FIG. 1) will load beams 26 and 28 in such a way as to induce bending. However, a moment about axis Z as well as either forces or moments about axes X or Y will produce only compressive or tensile forces in the beams.

Assume first that the load cell is subjected to a compressive force along the Z axis, that is, a downward force is applied to upper structure 32 of FIG. 5 and an equal and opposite upward force is applied to lower structure 34. A typical pair of beams 26a and 28b will deflect as shown in FIG. 6. For the purpose of this analysis, only the forces labeled $F_z$ are relevant, the moments $M_y$ shown in that figure being for subsequent analyses. As shown in FIG. 6 and 7, strain gages 30 bonded to opposite ends of the upper faces of the beams will be subjected to opposite forces. That is, the strain gage at the left end of the upper face of either beam 26a or 28b will sense a tensile or elongating strain, while the strain gage at the upper face of the right end of either beam 26a or 28b will sense a compressive strain. This is the desired beam loading pattern induced when the load cell is subjected to forces along the preselected axis.

When the strain gages 30 are wired into a wheat-stone bridge network in the conventional manner, with the gages of a given beam wired into adjacent bridge arms, the circuit will have an analogous output proportional to the load applied along the preselected Z axis. The circuit will register the difference between the oppositely loaded (that is, compression and tension) gages.

Next, let it be assumed that the load cell of FIG. 5 is subjected to an applied moment about axis Z. If the direction of the moment is such as to tend to revolve upper structure 32 clockwise (as it is viewed in the downward direction in FIG. 5), and an equal and opposite moment is applied to lower structure 34, it will be seen that all of the beams 26a and 28b will be subjected to an axially compressive force, while all of the beams 28a and 26b will be subjected to an axially tensile force.

In such a situation where the beams are subjected to purely axial loads, the strain gages at both ends of a given beam will each sense an equal strain of like sign. Hence, there will be no output signal from the wheatstone circuit, since only differences between the readings of the two gages on a beam yield a signal. In this way, the load cell isolates or fails to respond to an extraneous input load in the form of a moment about the Z axis.

Assuming next that the structures are subjected to equal and opposite compressive loads along the X axis, that is, assuming structure 32 is subjected to a leftward force and structure 34 to a rightward force, then such an external force will produce an identical pattern of loading as that described immediately above. An applied compressive force along the X axis will place all of beams 26a and 28b in axial compression, and beams 28a and 26b in axial tension. No bending forces would be registered by the strain gages.

Similarly, applied forces along the Y axis would produce no bending forces on any of the beams.

Finally, the reaction of the load cell to a moment about the Y axis will be analyzed. Referring to FIGS. 5 and 6, a clockwise moment on the upper or right-hand structure 32 and an opposite or counterclockwise resisting moment on the left-hand or lower structure 34 will produce an axially compressive force on lower beam 28b and an axially tensile force on upper beam 26a. A free body diagram would reveal reactive forces establishing a resisting couple equal to the magnitude of such axial force in one of the beams times the distance $d$ between the two beams. Hence, again no bending stresses will be produced by a moment about the Y axis. The same analysis would apply to a moment about the X axis.

The above analyses of the various applied forces and moments are typical of the response of the load cell. It is to be understood that an applied force or moment of opposite sign, or a study of a different beam in the cell, might change the sign of the forces involved but would not affect the significant fact of the presence of absence of bending stresses.

From the above discussion it will be seen that all of the aforementioned objectives of this invention have been accomplished by the unique load cell configuration herein described. Only forces along the preselected axis will induce bending stresses in the beams, with all extraneous forces and moments producing only compressive or tensile forces in the beams. Hence, the accuracy of this load cell is substantially increased.

Many advantages flow from the novel tangential arrangement of the beams. No external flexure system is required. The overall height of the cell is minimized, or more efficiently utilized, since the structure in effect wraps around the axial points of connection to the external load-applying members. This permits the spacing between the two levels of beams to be maximized, thus reducing the magnitude of the compressive or tensile forces induced by extraneous applied moments.

The tangential beam placement eliminates sensitivity to attachment conditions at the hub, and also eliminates sensitivity to radial strains caused by heat treatment or thermal gradients.

While the beams have been shown as having a uniform cross section, they could be made variable to optimize the strain distribution along the beam length. The load cell has been shown as fabricated of two identical generally U-shaped elements, but it could be formed as one piece or the columns could be tied together in any fashion provided that the beams respond to applied forces and moments as described above. While the cell illustrated is adapted for axial connections, one or both of the hub bosses could be eliminated and external connections made to the respective column pairs or peripheral or radial extensions thereof.

Still another advantage is that the beams are exposed and readily accessible for the mounting of the strain gages and the securing of the necessary electrical connections thereto. In view of the symmetry of the beam loading pattern, it is only necessary to mount gages on one of the two beam levels. The gages can be part of a printed circuit bonded directly to the beams or they can be connected by jumper wires to a printed circuit mounted elsewhere on the cell. The two gages on a given beam can be formed and mounted on a common backing, thus permitting a constant and highly accurate spacing or "a" dimension (see FIG. 7), which in turn produces extremely accurate measurements of the applied load.

This invention may be further developed within the scope of the following claims. Accordingly, the above specification is to be interpreted as illustrative of only a single operative embodiment of this invention, rather than in a strictly limited sense.

I now claim:

1. An improved load cell for measuring with strain gages the magnitude of forces aligned with a preselected axis, while being insensitive to all other forces and moments, which comprises:

a first system of four substantially coplanar beams arranged as the four sides of a parallelogram;

a second system of four substantially coplanar beams arranged as the four sides of a parallelogram;

the planes of said first and second beam systems each being perpendicular to the preselected axis representing the line of action of the forces to be measured, said beam systems being spaced from each other along said preselected axis and so oriented as to place the individual beams in one of said systems in substantial alignment and superposition in relation to the respective beams of the other of said systems when viewed along said preselected axis;

one pair of opposite vertices of said first system being rigidly connected to each other and to the corresponding pair of opposite vertices of said second beam system by a first auxiliary structure, and the remaining pair of opposite vertices of said first beam system being connected to each other and to the corresponding pair of opposite vertices of said second beam system by a second auxiliary structure, said first and second auxiliary structures being spaced from each other and free of any interconnection except that provided by said eight beams, and said beams being free of any contact with any surface or body whatsoever along substantially their entire length intermediate their ends;

each of said auxiliary sructures being provided with a connecting means or force application surface through which they can be subjected to equal and opposite external forces along the preselected axis, and each of said auxiliary structures being of sufficient strength to be essentially rigid when subjected to forces below a predetermined limit;

each of said beams being so dimensioned as to be resiliently yieldable when subjected to bending forces parallel to and induced by the externally applied force to be measure, which externally applied force is transmitted to the respective ends of each of said beams by said auxiliary structures, and said beams being relatively nonyieldable when subjected to linear forces acting along any other axis;

whereby appropriately connected strain gages applied to said beams can be calibrated to measure the magnitude of the unknown external force by their indication of the induced bending strains in said beams, all externally applied forces or moments other than forces along the preselected axis inducing compressive or tensile stresses rather than bending stresses in said beams.

2. The load cell of claim 1 wherein the four beams in each of said first and second beam systems are arranged as the four sides of a square.

3. The load cell of claim 1 wherein each of said beams to which strain gages are applied has a pair of said gages bonded thereto in such a position that one of said gage pair will be subjected to a compressive strain and the other of said gage pair will be subjected to a tensile strain when the gaged beam is subjected to bending from a force along the preselected axis.

4. The load cell of claim 1 wherein said connecting means of at least one of said auxiliary structures is located along the central preselected axis, and wherein said connecting means of said auxiliary structures are capable of transmitting both compressive and tensile forces along the preselected axis.

5. The load cell of claim 1 wherein said connecting means of at least one of said auxiliary structures is located radially outwardly from the central preselected axis, and wherein said connecting means of each of said auxiliary structures are capable of transmitting both compressive and tensile forces along the preselected axis.

6. An improved load cell for measuring with strain gages the magnitude of forces aligned with a preselected axis, while being insensitive to all other forces and moments, which comprises:

first and second rigid U-shaped auxiliary structures, each of said structures including a pair of parallel legs and a center portion interconnecting and perpendicular to said legs, said structures being inverted relative to each other so that the respective legs face inwardly of the load cell and are all parallel to the preselected axis, said auxiliary structures being further arranged so that the center portions perpendicularly bisect each other when viewed along the preselected axis, and said auxiliary structures being compactly telescoped toward each other along the preselected axis but free of any contact or connection with each other, said auxiliary structures being of sufficient proportions and strength to be essentially rigid when subjected to forces below a predetermined limit;

a first system of four substantially coplanar beams arranged as the four sides of a square said first beam system interconnecting each of the two free ends of the legs of said first auxiliary structure with each of the center portion-connected ends of the legs of said second auxiliary structure;

a second system of four substantially coplanar beams arranged as the four sides of a square, said second beam system interconnecting each of the two free ends of the legs of said second auxiliary structure with each of the center portion-connected ends of the legs of said first auxiliary structure, said first and second beam systems each being perpendicular to the preselected axis and axially spaced and aligned with each other relative to the preselected axis;

said eight beams being resiliently yieldable in response to compressive or tensile forces applied to said auxiliary structures along said preselected axis;

whereby appropriately connected strain gages applied to said beams can be calibrated to measure the magnitude of the unknown external force by their indication of the induced bending strains in said beams, all externally applied forces or moments other than forces along the preselected axis inducing compressive or tensile stresses rather than bending stresses in said beams.

7. The load cell of claim 6 wherein each of said beams to which strain gages are applied has a pair of said gages bonded thereto in such a position that one of said gage pair will be subjected to a compressive strain and the other of said gage pair will be subjected to a tensile strain when the gaged beam is subjected to bending from a force along the preselected axis.

8. The load cell of claim 6 wherein said connecting means of at least one of said auxiliary structures is located along the central preselected axis, and wherein said connecting means of each of said auxiliary structures are capable of transmitting both compressive and tensile forces along the preselected axis.

9. The load cell of claim 6 wherein said connecting means of at least one of said auxiliary structures is located radially outwardly from the central preselected axis, and wherein said connecting means of each of said auxiliary structures are capable of transmitting both compressive and tensile forces along the preselected axis.